May 21, 1946.  W. O. FORMAN  2,400,815
MACHINE TOOL CONTROL
Filed Oct. 1, 1942  4 Sheets-Sheet 2
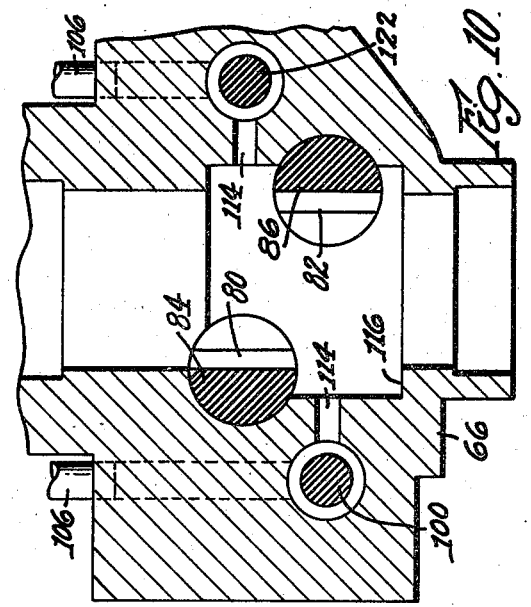
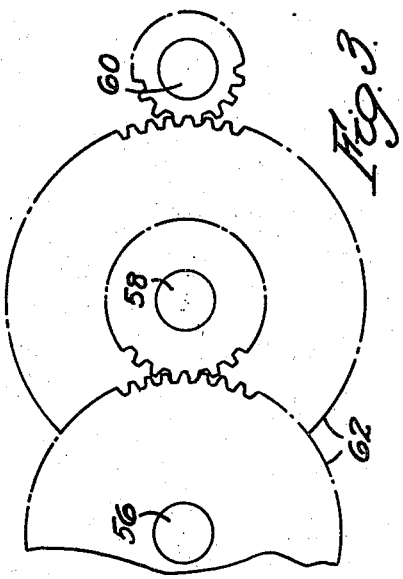
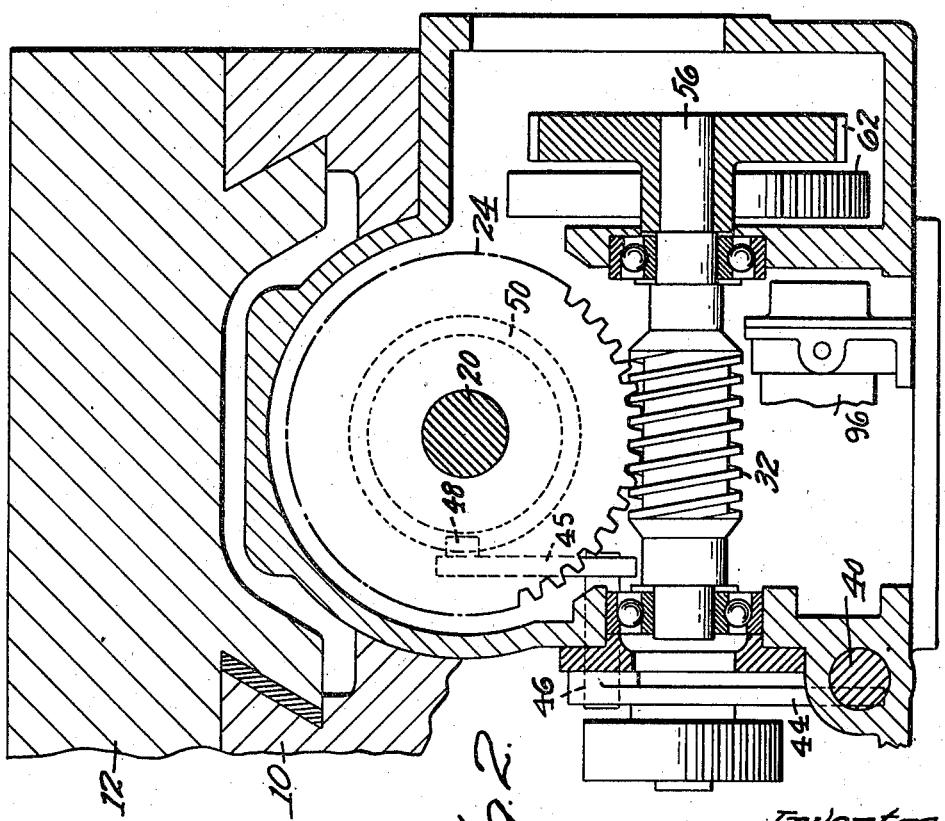
Inventor:
William O. Forman.
By attorney
Charles R. Fay

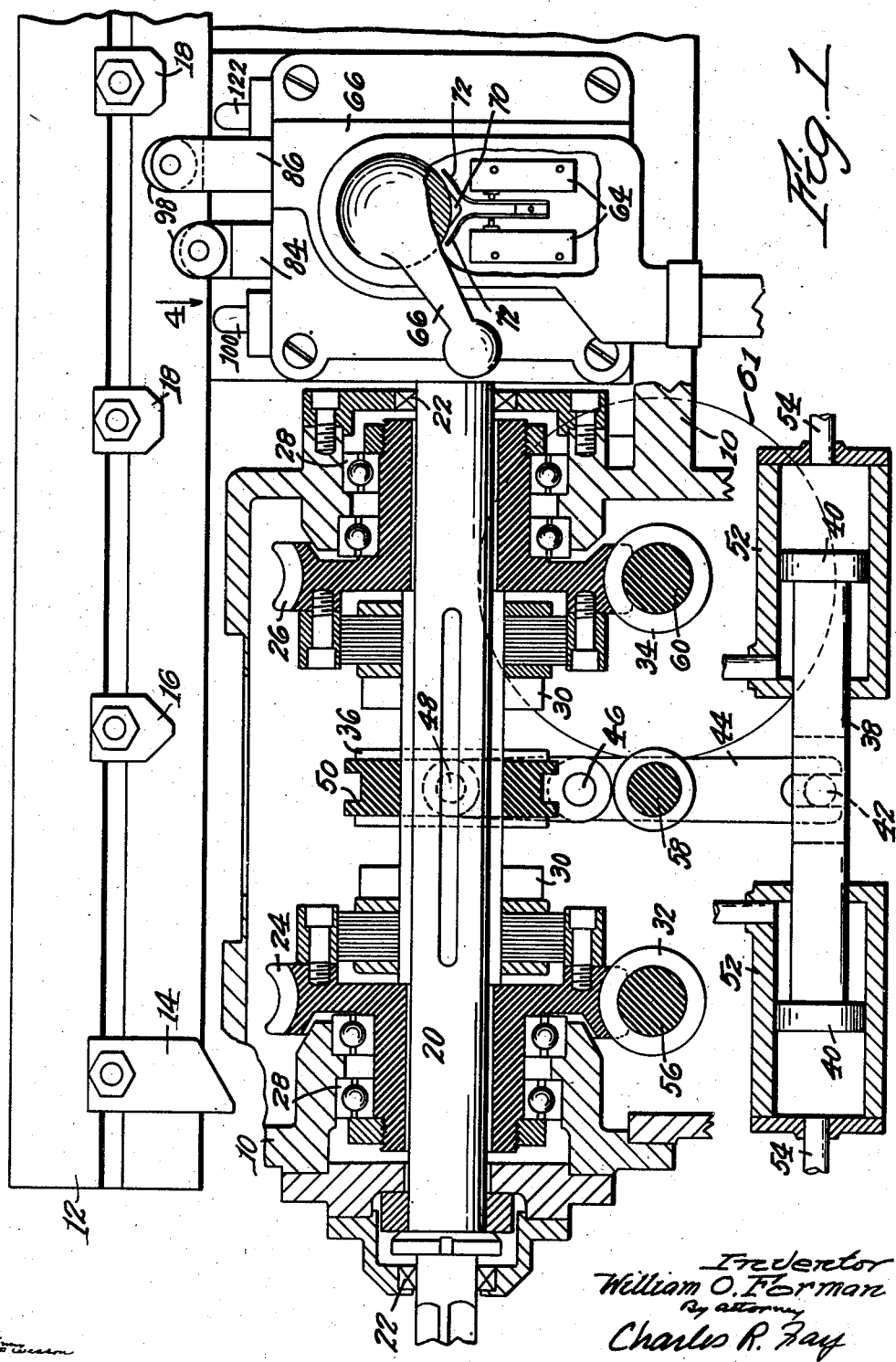

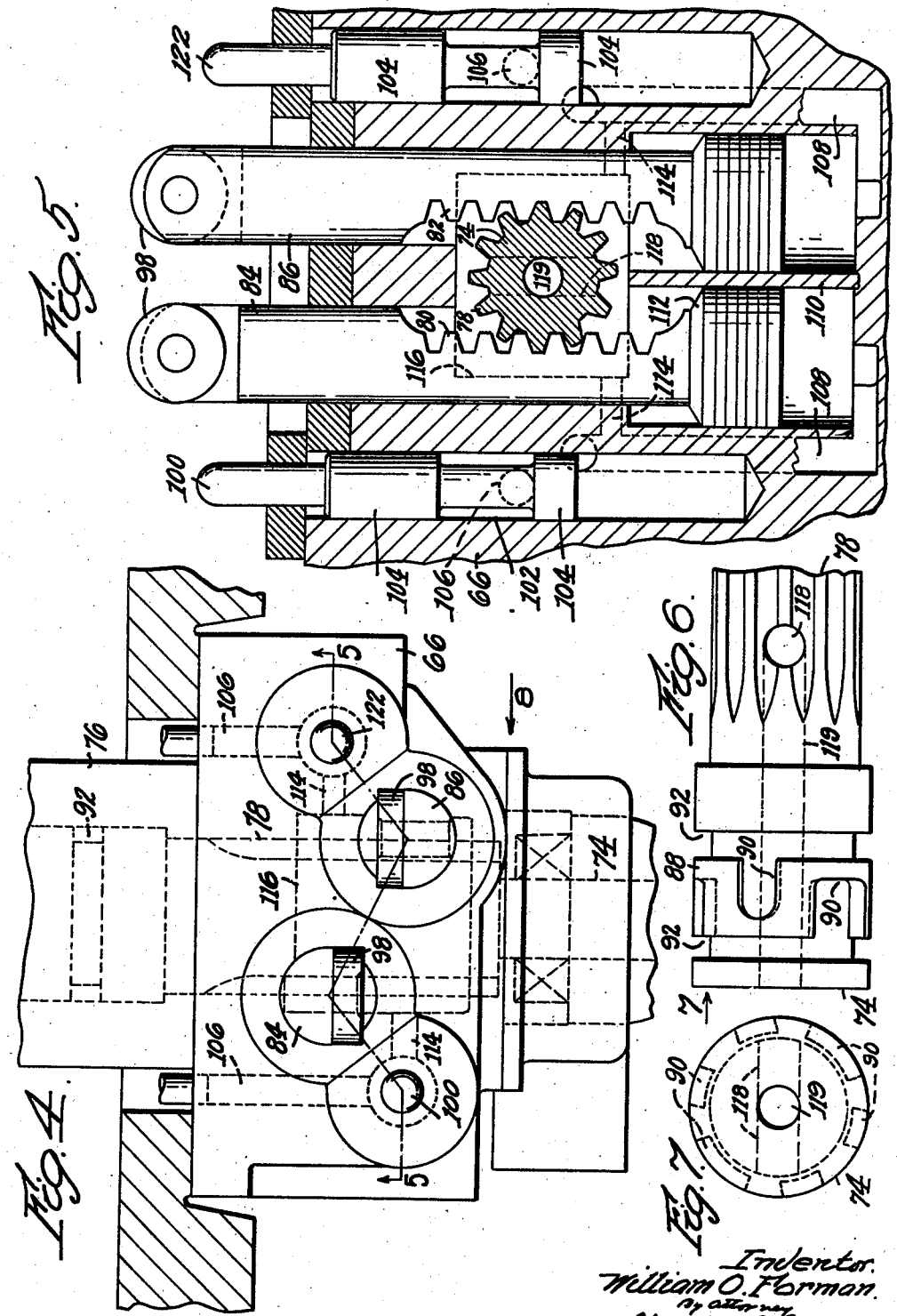

May 21, 1946. W. O. FORMAN 2,400,815
MACHINE TOOL CONTROL
Filed Oct. 1, 1942 4 Sheets-Sheet 4

Inventor
William O. Forman.
By attorney
Charles R. Fay

Patented May 21, 1946

2,400,815

UNITED STATES PATENT OFFICE 2,400,815

MACHINE TOOL CONTROL

William O. Forman, Fitchburg, Mass., assignor to Fitchburg Engineering Corporation, Fitchburg, Mass., a corporation of Massachusetts Application October 1, 1942, Serial No. 460,382

14 Claims. (Cl. 90—21)

This invention relates to control mechanism for the reversal and selective speed control for a milling machine.

Objects of the invention include the provision of a motor driven reciprocal work table for a milling machine, there being a transmission gearing for change of speed of travel for the table in combination with a special hydraulic system for operating the transmission; the provision of means operated by dogs on the work table for increasing and decreasing the table speed at desired points in its travel and means for reversing the motor at the ends of the travel; the provision of a special rotary valve operated by the table dogs at predetermined points in its travel to reciprocate a plunger connected to a clutch in the transmission gearing to change speeds; and the provision of an efficient and quick operation device for obtaining changes in speed and reversal of travel of a milling machine table.

Other objects and advantages of the invention will appear hereinafter.

Reference is to be had to the accompanying drawings, in which

Fig. 1 is a vertical longitudinal cross-section thru the transmission showing the table drive shaft and the clutch operator;

Fig. 2 is a vertical transverse section thru the transmission;

Fig. 3 shows details of the transmission gearing;

Fig. 4 is an enlarged plan view of the control housing looking in the direction of arrow 4 in Fig. 1;

Fig. 5 is a section on line 5—5 of Fig. 4;

Fig. 6 is a side elevation of the rotary valve, parts being broken away;

Fig. 7 is an end view of the rotary valve looking in the direction of arrow 7 in Fig. 6;

Fig. 10 is a horizontal section thru the control housing.

Figures 8, 9:
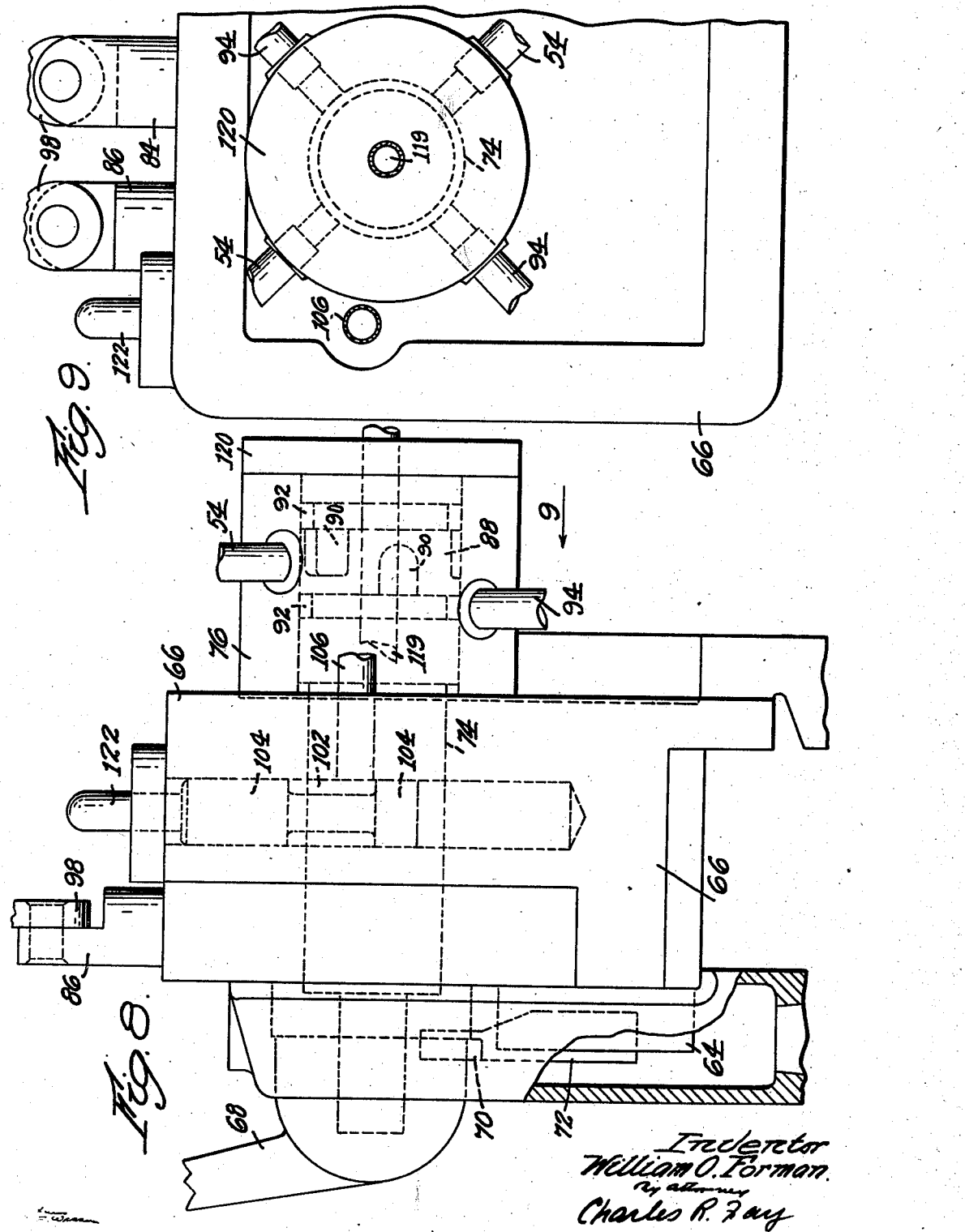
Fig. 8 is a side elevation of the control housing looking in the direction of arrow 8 in Fig. 4.
Fig. 9 is a rear elevation of the control housing looking in the direction of arrow 9 in Fig. 8.

In Fig. 1 of the drawings, there is shown a bed 10 supporting a table 12 for longitudinal reciprocal travel thereon, the table having adjustably bolted thereon dogs 14, 16, 18, etc., the table being shown at an intermediate position in its reciprocation. A shaft 20 is rotatably mounted in the bed by bearings 22 and is operatively connected to the table to travel the same in either direction depending on its rotational direction by such convenient means as a screw and nut connection not shown.

A pair of worm wheels 24, 26 are rotatably mounted in the bed 10 by bearings 28, and each wheel has secured thereto a clutch element 30, these clutch elements facing each other and surrounding shaft 20 in rotatable relation thereto. A pair of worms 32, 34 of different pitch are journaled in the bed 10 and mesh with their corresponding wheels.

A clutching element 36 is keyed to shaft 20 for longitudinal non-rotational movement with respect thereto. A plunger 38 having a piston 40 at each end has a pin and slot connection 42 with one end of a lever 44 mounted to pivot on an axis transverse to the plunger, as by being fast to a pin 46, the latter having an element 45 fast thereto with a stud 48 running in a groove 50 in the periphery of the clutching element 36. Each piston 40 is housed in a separate cylinder 52 having end inlet and outlet pipes 54. If pressure be admitted to an end of one of the pistons while the opposite end of the other is exhausted, the clutching member 36 will be moved out of neutral, illustrated in Fig. 1, and moved to engage the respective clutch element 30 thru the resultant pivotal action of lever 44.

There are three parallel shafts in the transmission housing, shaft 56 mounting worm 32, an intermediate shaft 58, and shaft 60 for worm 34, see Fig. 3. A motor 61 is adapted to rotate shaft 60 directly and constant mesh reducing gears 62 are mounted on shafts 58 and 56. Hence a unidirectional motor would rotate shaft 20 in a single direction no matter which clutch element 30 is engaged, and for reversal of shaft 20, microswitches 64 are provided in the control housing 66 for reversing the motor. A handle 68 is rotatably mounted in the control housing, and this handle has a cam 70 which will impinge on and displace spring strips 72 secured to the housing to operate the micro-switches when the handle is turned far enough in the appropriate directions. Gears 62 may be replaced by different diameter gears for desired speed variations.

Handle 68 is fixed to one end of a shaft 74 which is rotatably journaled in housing 66 and extends rearwardly thru it and into a valve casing 76, as indicated in Figs. 4 and 8. Longitudinal peripheral gear teeth 78 are provided on the shaft and these teeth mesh with racks 80, 82 on facing sides of a pair of vertical plungers 84, 86. The rear end of the shaft 74 is provided with a valve element 88 having slots 90, leading alternately and oppositely to grooves 92, the latter being connected by pipes 94 to the opposite sides of a pump 96, conveniently located in bed 10. By rotation of shaft 74, pipes 54 will be alternately connected by the grooves 92 to the pressure and exhaust sides of the pump, so that the plunger 38 will cause the shaft 20 to be driven at different speeds thru worm wheels 24 or 26 upon alternate depression of plungers 84, 86. The latter are offset as shown in Fig. 4, and operating dogs 16, 18 may be offset as desired so as to obtain speed changes at the desired points in the bed travel by prearranged engagement of one plunger wheel 98 by a certain dog sequence.

It is to be here particularly noted that spring strips 72 will not be crowded far enough at the above described rotation of shaft 74 to operate the micro-switches, as it is not desired to reverse the motor at each speed change, as will be obvious. This invention contemplates the use of the hydraulic system to actuate the plungers 84, 86 in turn and more rapidly than the dog action, to accomplish sufficient rotation of cam 70 to actuate the switches.

To accomplish this, a reversal plunger 100 is vertically slidably arranged in the control housing 66 in position to be depressed by an end dog 14. There is a reversal plunger for each plunger 84 and 86, their hydraulic systems being substantially the same. Each reversal plunger has a long groove 102 between piston-like abutments 104, and a pressure line 106 leads into the reversal plunger cylinder so that it is effectively cut off when the reversal plunger is in raised position. However, when the reversal plunger is depressed, its groove 102 will connect line 106 with a passage 108 leading thru the housing to the bottom of cylinder 110 accommodating a piston 112 on the lower end of plunger 84, so that the latter will be forced rapidly upwardly to the full extent of its travel thus snapping shaft 74 over to effectively crowd a spring strip 72 to operate a switch. Any convenient means may be utilized to return the reversal plunger to its usual up position, as by a spring or further hydraulic means not shown.

A passage 114 below the top opening of passage 108 leading from this passage to a central cavity 116 accommodating shaft 74 may be provided to permit expulsion and exhaust of liquid in cylinder 110 upon the reversal action of plunger 86, shaft 74 having passages 118 opening into the cavity and communicating with a longitudinal passage 119 for connection thru a cap plate 120 to the exhaust side of the pump 96. The reversal plunger 122 will operate similarly to plunger 100.

The present invention will be seen to provide an efficient and fact action device for arranging desired fast and slow bed table travel in as many cycles as desired in both directions of reciprocation of the table, or a fast travel in one direction and slow in the other can be obtained, all thru the positioning of the dogs 16, 18 in predetermined locations lengthwise of the table.

Having thus described my invention and the advantages thereof, I do not wish to be limited to the details herein disclosed, otherwise than as set forth in the claims, but what I claim is:

1. In a machine tool, a bed, a traveling table, a shaft operatively connected to said table to travel the same, means to reverse the shaft, a pair of spaced gears adapted to be driven at different speeds, a clutch element slidable on said shaft to clutch either gear thereto, a cylinder, a plunger in said cylinder, a linkage between said plunger and clutch element whereby the former slides the latter between clutching positions thereof, a pair of plungers on said bed, dogs on said table to selectively depress said pair of plungers to a certain extent and means to depress said plungers to a different extent, a valve operated by said pair of plungers to different degrees, connections from said valve to said cylinder for control of the latter at one degree of operation of the valve, said valve operating the shaft reversing means at a different degree of operation of the valve.

2. In a machine tool, a bed, a traveling table, a motor and speed changer to travel said table, reversing switches for said motor, a shaft in said bed, and means adapted to selectively rotate said shaft in opposite directions to different degrees, said means comprising a pair of plungers geared at opposite sides of said shaft, table dogs to depress the plungers to a certain extent, a cylinder for each plunger, a pipe to each cylinder, a source of hydraulic pressure, a valve in each pipe to move the plungers to a different extent, dogs on said table to operate said valves during the table travel, and means on said shaft to operate said switches and speed changer depending on the degree of rotation of said shaft.

3. In a machine tool, a bed, a table mounted thereon for movement with respect thereto, a motor to move said table, a pair of reversing switches for said motor, and means to operate said switches, said means comprising a shaft, a pair of plungers geared at opposite sides to said shaft, a cylinder for each plunger, a valve for admitting pressure to each cylinder to move a plunger to a certain extent and thus turn said shaft to a certain degree, each valve comprising a plunger adapted to be depressed by said table in its travel, and means on said shaft to throw either switch depending on the direction of rotation of the shaft to said degree, said plungers being movable to a different extent, table dogs to engage and move the plungers, whereby the shaft is turned to a different degree, means to change the speed of table travel, said last named means being operatively connected to the shaft for operation thereby only upon turning of the shaft to said different degree.

4. In a machine of the class described, a bed, a table mounted for sliding movement thereon, a motor to travel said table, a speed changer between said motor and table, hydraulic means to shift speeds in said speed changer, a rotary valve to control said hydraulic means, a pair of switches for reversing said motor, means on said valve to operate said switches upon certain reversals of the valve, a pair of plungers adapted for actuation by said table in its movements, said plungers being connected to said rotary valve to turn it in opposite directions, a valve for each plunger to control admission of hydraulic pressure thereto to move said plungers a greater degree than said table to thereby rotate said valve to a correspondingly greater degree to operate the reversing switches, said plunger valves being operated by said table in its movements.

5. In a machine of the class described, the combination of a bed, a table mounted for reciprocation on said bed, dogs on the table, a motor for traveling the table, reversing switches for the motor, movable means for actuating the switches, valves operable by certain of said table dogs, hydraulic means comprising pistons movable to a certain extent under influence of the valves, said pistons thereby being effective to move said movable means to actuate the switches, said pistons being movable to a different extent by others of said dogs to move the movable means to a different degree, with means to vary the rate of travel of the table, said last named means comprising a speed changer, a clutch for operating the speed changer, and means to actuate the clutch, said clutch actuating means being in turn controlled by the movable means, as the latter is moved to said different degree.

6. The combination of claim 5 wherein said movable means comprises a rotary shaft and including a cam on the shaft to contact and actuate the switches.

7. The combination of claim 5 including a rotary valve, said clutch actuating means comprising a hydraulic piston, the valve controlling the piston, and said movable means acting to rotate the valve.

8. In a machine tool, a base, a traversing table thereon, a shaft in the base operatively associated with the table to travel the latter in either direction, dogs on the table, a reversible motor connected to drive the shaft, speed changing mechanism between the motor and shaft, means to actuate the mechanism to vary the speed of travel of the table, said means comprising a hydraulic cylinder, a movable valve for said cylinder, a reversing switch to reverse the motor, and means associated with the movable valve to actuate the switch, said last named means comprising plungers in the path of certain of the dogs for actuation by the latter to a certain extent, said plungers being operatively associated with the movable valve to move the latter upon actuation by the said certain dogs, valves actuated by other dogs to cause movement of said plungers to a different extent to move the movable valve to a different degree to control the cylinder, said dogs being adjustably arranged for changing the speed and direction of the table at desired intervals or selectively simultaneously.

9. In a machine tool, a bed, a shaft therein, a reversible motor for the shaft, a speed changer for the shaft, hydraulic means to operate the speed changer, switches to reverse the motor, a table traveled by the shaft, and dogs on the table, a rotary valve controlling the hydraulic means and the switches upon different degrees of rotation of the valve, plungers operatively connected to the rotary valve to rotate the latter, said dogs engaging and depressing the plungers to a certain extent to cause rotation of the valve to a certain operative degree, and valves to cause movement of the plungers to a different extent effecting rotation of the rotary valve to a different operative degree, and means to actuate the plunger-moving valves.

10. In a machine tool, a bed, a shaft therein, a reversible motor and speed changer for the shaft, hydraulic means to operate the speed changer to change the shaft speed, switches to reverse the motor, a table connected to and traveled by the shaft, and dogs on the table, a movable valve operating the hydraulic means and the switches upon different degrees of movement thereof, a valve operator to move the valve to said different degrees, said valve operator being actuated by certain dogs to a certain extent to effect one degree of movement of the valve, and means to move the valve operator to a different extent to effect a different degree of movement of the valve, said last named means being actuated by others of said dogs.

11. The machine tool of claim 10 wherein said last named means comprises a valve and said valve operator comprises a piston.

12. The machine tool of claim 10 wherein said movable valve is rotary and said valve operator comprises a reciprocal plunger geared thereto.

13. The machine tool of claim 10 wherein said valve is rotary and the valve operator comprises a plunger geared thereto, said last named means comprising a valve operatively associated with the plunger to actuate the latter hydraulically.

14. The machine tool of claim 10 wherein said hydraulic means comprises a cylinder and piston, said piston being connected to the speed changer.

WILLIAM O. FORMAN.